US012688571B1

(12) United States Patent (10) Patent No.: US 12,688,571 B1
Orr et al. (45) Date of Patent: Jul. 21, 2026

(54) INTERIOR DEFECT DETECTION THROUGH VEHICLE GLAZING USING MULTI-VIEW MOTION ANALYSIS AND ASYMMETRIC ILLUMINATION

(71) Applicant: UVeye Ltd., Tel Aviv (IL)

(72) Inventors: Itai Orr, Or Akiva (IL); Amir Hever, Tenafly, NJ (US)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/415,983

(22) Filed: Dec. 11, 2025

(51) Int. Cl.
| | |
|---|---|
| *G06T 7/00* | (2017.01) |
| *G06T 3/18* | (2024.01) |
| *G06T 5/70* | (2024.01) |
| *G06T 5/73* | (2024.01) |
| *G06T 7/246* | (2017.01) |
| *G06T 7/579* | (2017.01) |
| *G06V 10/141* | (2022.01) |

(Continued)

(52) U.S. Cl.
CPC .............. *G06T 7/0002* (2013.01); *G06T 3/18* (2024.01); *G06T 5/70* (2024.01); *G06T 5/73* (2024.01); *G06T 7/246* (2017.01); *G06T 7/579* (2017.01); *G06V 10/141* (2022.01); *G06V 10/60* (2022.01); *G06V 10/764* (2022.01); *G06V 20/59* (2022.01); *G06V 40/103* (2022.01); *G06V 40/161* (2022.01); *G06T 2207/10152* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 10,814,800 | B1 * | 10/2020 | Gould | B60R 25/1004 |
| 11,287,391 | B2 * | 3/2022 | Yu | G01F 17/00 |

(Continued)

OTHER PUBLICATIONS

Liu, Zhidan, et al. "Multi-Label Stereo Matching for Transparent Scene Depth Estimation." arXiv preprint arXiv:2505.14008 (2025). (Year: 2025).*

(Continued)

*Primary Examiner* — Matthew C Bella
*Assistant Examiner* — Johnny B Duong

(57) ABSTRACT

A method and system for detecting interior defects in vehicles through glazing without requiring door opening or interior sensor installation. The system captures multi-view images of vehicle window panes from spatially separated viewpoints during relative motion between vehicle and imaging device. Motion field data representing pixel displacement is computed and used to classify pixels into interior-origin pixels exhibiting apparent depth behind the window pane plane and reflection-origin pixels exhibiting apparent depth at the glass surface. An interior-enhanced image is generated through motion refocusing that sharpens interior textures while blurring glass-plane reflections. Optional asymmetric illumination and polarization provide additional reflection suppression. Transmittance compensation accounts for glazing tint and spectral characteristics. Defect detection algorithms identify interior defects including seat damage, missing components, and structural defects, with privacy-aware redaction of occupants integrated into the processing pipeline.

20 Claims, 2 Drawing Sheets

Figure 1:
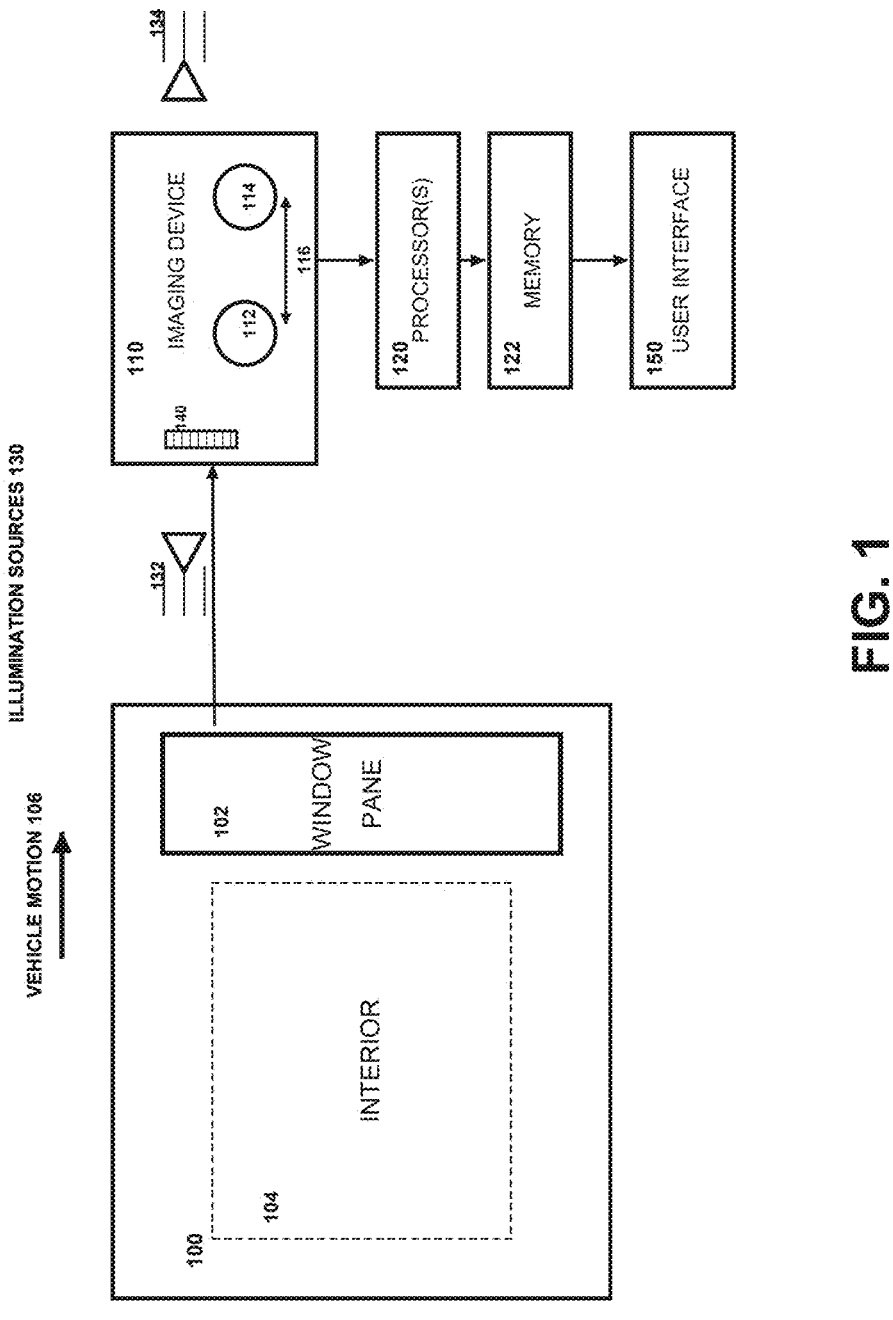

(51) Int. Cl.

| | |
|---|---|
| *G06V 10/60* | (2022.01) |
| *G06V 10/764* | (2022.01) |
| *G06V 20/59* | (2022.01) |
| *G06V 40/10* | (2022.01) |
| *G06V 40/16* | (2022.01) |

(56) References Cited

U.S. PATENT DOCUMENTS

| | | | |
|---|---|---|---|
| 2022/0358775 A1* | 11/2022 | Hantehzadeh | ............ G06T 7/11 |
| 2025/0022290 A1* | 1/2025 | Sivaraman | ............. G06V 20/59 |

OTHER PUBLICATIONS

Xue, Yadong, et al. "3D reconstruction and automatic leakage defect quantification of metro tunnel based on SfM-Deep learning method." Underground Space 7.3 (2022): 311-323. (Year: 2022).*

Min, Junhong, et al. "DepthFocus: Controllable Depth Estimation for See-Through Scenes." arXiv preprint arXiv:2511.16993 (2025). (Year: 2025).*

Tong, Kunkun, et al. "Confusing Object Detection: A Survey." Computers, Materials & Continua 80.3 (2024). (Year: 2024).*

* cited by examiner

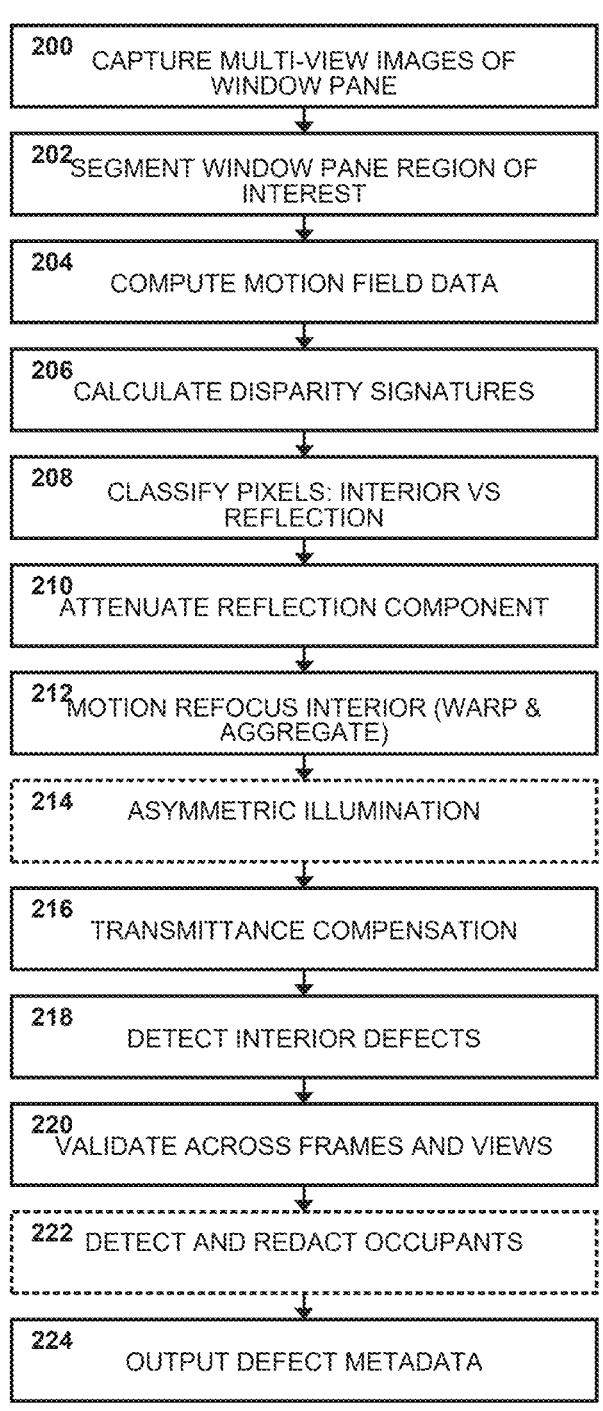

200 CAPTURE MULTI-VIEW IMAGES OF WINDOW PANE

202 SEGMENT WINDOW PANE REGION OF INTEREST

204 COMPUTE MOTION FIELD DATA

206 CALCULATE DISPARITY SIGNATURES

208 CLASSIFY PIXELS: INTERIOR VS REFLECTION

210 ATTENUATE REFLECTION COMPONENT

212 MOTION REFOCUS INTERIOR (WARP & AGGREGATE)

214 ASYMMETRIC ILLUMINATION

216 TRANSMITTANCE COMPENSATION

218 DETECT INTERIOR DEFECTS

220 VALIDATE ACROSS FRAMES AND VIEWS

222 DETECT AND REDACT OCCUPANTS

224 OUTPUT DEFECT METADATA

FIG. 2

INTERIOR DEFECT DETECTION THROUGH VEHICLE GLAZING USING MULTI-VIEW MOTION ANALYSIS AND ASYMMETRIC ILLUMINATION

FIELD AND BACKGROUND OF THE INVENTION

The present invention relates generally to automated vehicle inspection systems and, more particularly, to systems and methods for detecting interior defects in vehicles through glazing using multi-view motion analysis, asymmetric illumination, and optional polarization techniques.

Vehicle inspection processes conventionally require manual opening of vehicle doors to visually assess interior conditions. This manual inspection approach presents several technical limitations. Manual door-opening inspection typically processes approximately 40-60 vehicles per hour, requiring approximately 60-90 seconds per vehicle including handling time. The labor-intensive nature of this process results in direct inspection costs of approximately one dollar per vehicle when accounting for two operators at 25 dollars per hour processing 50 vehicles per hour. Beyond direct labor costs, the physical act of repeatedly opening vehicle doors introduces risks of door damage, interior contamination, and potential warranty claims on interior rework. Furthermore, installation and removal of interior camera systems for inspection purposes adds substantial equipment and operational complexity.

SUMMARY OF THE INVENTION

Existing through-glass imaging approaches face fundamental technical challenges related to specular reflections from vehicle glazing. When capturing images through vehicle windows, reflections from the glass surface corrupt the transmitted interior image. These reflections arise from environmental lighting, including sky, structures, and other vehicles, and create specular components that overlay and obscure interior features. The specular reflection energy can dominate the captured image, particularly for tinted glazing where transmittance values vary between 65-85 percent and colored tints introduce chromatic bias. Single-view imaging systems lack the geometric information necessary to distinguish between light rays that originated from interior surfaces behind the glass plane and light rays that represent reflections on the glass surface itself.

The technical problem of separating reflection components from transmission components through glazing is complicated by the dynamic nature of vehicle inspection lanes where both the vehicle and imaging system are in relative motion. This motion creates temporal variations in both the interior scene geometry and the reflected environmental components. Prior approaches have not adequately addressed the computational challenge of performing real-time depth-based classification of pixels into interior-origin versus reflection-origin categories while the vehicle traverses an inspection lane at operational speeds. Moreover, the color accuracy requirements for defect detection demand transmittance compensation techniques that account for per-pane variations in glass tint and spectral filtering characteristics.

The reflection suppression problem is further exacerbated under bright ambient conditions where high-intensity environmental reflections can completely saturate the captured image in regions corresponding to the glass surface. The absence of controlled illumination strategies that selectively enhance interior-to-reflection contrast ratios limits the effectiveness of existing through-glass imaging systems. Additionally, privacy considerations require automated redaction of occupants while preserving defect evidence, introducing an additional layer of computational complexity that must be integrated into a real-time inspection pipeline.

There therefore exists a need in the art for an automated vehicle interior inspection system that can detect defects through glazing without requiring door opening or interior sensor installation, while robustly suppressing reflections through geometric analysis and optional asymmetric illumination, maintaining color fidelity through transmittance compensation, and operating at throughput rates that exceed manual inspection by at least an order of magnitude.

Embodiments of the he present invention overcomes the limitations of prior art vehicle inspection systems by providing a method and system for detecting interior defects through vehicle glazing using multi-view motion analysis with optional asymmetric illumination and polarization. The invention achieves robust separation of interior transmission components from glass-plane reflection components through parallax-based classification while the vehicle undergoes relative motion with respect to an imaging system.

In accordance with some aspects of the present invention, there is provided a method for detecting interior defects in a vehicle through glazing. The method comprises capturing, with an imaging device positioned external to the vehicle, a plurality of images of a vehicle window pane from at least two spatially separated viewpoints as the vehicle changes a position relative to the imaging device. The method further comprises computing, for pixels within a region of interest corresponding to the window pane, motion field data representing pixel displacement. The method additionally comprises classifying the pixels based on the motion field data into interior-origin pixels and reflection-origin pixels by comparing apparent depth of the pixels relative to a plane of the window pane, wherein pixels with apparent depth behind the window pane plane are classified as interior-origin pixels and pixels with apparent depth at or on the window pane plane are classified as reflection-origin pixels. The method further comprises generating an interior-enhanced image using the interior-origin pixels and the reflection-origin pixels, and applying a defect detection algorithm to the interior-enhanced image to identify one or more interior defects and outputting defect metadata identifying a detected interior defect and its location within the vehicle cabin.

The technical effect of the multi-view parallax-based classification may be a reflection suppression effectiveness of approximately 15-25 decibels, corresponding to a 95-99.7 percent reduction in reflection interference compared to baseline single-view capture. This substantial reduction in reflection energy enables reliable interior defect detection without requiring physical access to the vehicle interior.

The depth separation resolution of the system, defined as the smallest measurable apparent-depth offset between a reflection on the glass plane and a true interior feature, may be approximately 2-5 millimeters under typical operating parameters. With a focal length of approximately 8 millimeters, a baseline separation between viewpoints of approximately 25 centimeters, a window-to-interior distance of approximately 60 centimeters, and a pixel pitch of approximately 2 micrometers, the minimum resolvable depth difference can be calculated as the square of the interior depth multiplied by the disparity precision and divided by the product of baseline and focal length. Using a disparity precision of approximately 0.1 pixels achievable with modern optical flow algorithms, interior features positioned even a few millimeters behind the window plane are separable from reflections at the glass surface, which suffices for detecting defects on seats, dashboards, and trim surfaces.

The throughput improvement achieved by the automated system is substantial. The capture phase requires approximately 0.1-0.2 seconds per vehicle for burst acquisition, and processing requires approximately 0.5-1.0 seconds, yielding a total cycle time of less than or equal to 2 seconds per vehicle. This enables a throughput of approximately 1800-2500 vehicles per hour per lane, representing a 30-40 fold improvement over the 40-60 vehicles per hour achievable with manual door-opening inspection. The cost savings are correspondingly substantial, with automated imaging and computation amortized to approximately 0.05-0.10 dollars per vehicle compared to approximately one dollar per vehicle for manual inspection, representing a 90-95 percent reduction in direct inspection cost.

In accordance with other aspects of the present invention, there is provided a system for detecting interior defects in a vehicle through glazing. The system comprises an imaging device configured to be positioned external to the vehicle and to capture a plurality of images of a vehicle window pane from at least two spatially separated viewpoints as the vehicle changes a position relative to the imaging device. The system further comprises one or more processors and memory storing instructions that, when executed by the one or more processors, cause the system to compute, for pixels within a region of interest corresponding to the window pane, motion field data representing pixel displacement, classify the pixels based on the motion field data into interior-origin pixels and reflection-origin pixels by comparing apparent depth of the pixels relative to a plane of the window pane, wherein pixels with apparent depth behind the window pane plane are classified as interior-origin pixels and pixels with apparent depth at or on the window pane plane are classified as reflection-origin pixels, detect one or more interior defects and its location within the vehicle cabin based on an analysis of the interior-origin pixels and the reflection-origin pixels, and update an interface to present the one or more interior defects and its location within the vehicle cabin.

The technical advantages of the invention include interior defect detection capability without opening vehicle doors or adding interior sensors, robustness to window reflections through parallax classification and motion refocusing combined with optional illumination asymmetry, color-faithful interior inference using per-pane transmittance compensation, and privacy-aware evidence generation with integrated occupant redaction. These technical effects enable practical deployment of automated through-glass interior inspection in high-throughput vehicle processing environments.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 schematically illustrates a system for detecting interior defects in a vehicle through glazing, in accordance with one or more embodiments of the present invention; and FIG. 2 illustrates a flowchart of a method for detecting interior defects through vehicle glazing, in accordance with one or more embodiments of the present invention.

DESCRIPTION OF SPECIFIC EMBODIMENTS OF THE INVENTION

The present invention relates generally to automated vehicle inspection systems and, more particularly, to systems and methods for detecting interior defects in vehicles through glazing using multi-view motion analysis, asymmetric illumination, and optional polarization techniques.

Embodiments of the present invention provide a system and method for automated detection of interior defects in vehicles through window glazing without requiring physical access to the vehicle interior. The invention captures multiple images of vehicle window panes from spatially separated viewpoints while the vehicle undergoes relative motion with respect to an imaging device. Through computational analysis of motion field data and parallax-based depth classification, the system distinguishes between light rays that originated from interior surfaces behind the glass plane and light rays that represent specular reflections on the glass surface. The classified pixel data is processed through motion refocusing algorithms to generate an interior-enhanced image in which interior content is sharpened and reflection content is suppressed. A defect detection algorithm then analyzes the interior-enhanced image to identify and localize interior defects such as seat damage, missing components, and structural defects, with the results output as structured defect metadata including location information and photographic evidence.

Conventional vehicle interior inspection requires manual opening of vehicle doors to visually assess interior conditions, presenting substantial operational inefficiencies and quality control challenges. Manual door-opening inspection processes approximately 40 to 60 vehicles per hour, requiring 60 to 90 seconds per vehicle including handling time, and incurs direct labor costs of approximately one dollar per vehicle. The repetitive physical act of opening vehicle doors introduces risks of door damage, interior contamination, and potential warranty claims. Existing through-glass imaging approaches face fundamental technical limitations related to specular reflections from vehicle glazing that corrupt the transmitted interior image. When capturing images through vehicle windows, reflections from the glass surface create specular components that overlay and obscure interior features, with reflection energy often dominating the captured image particularly for tinted glazing where transmittance values vary between 65 and 85 percent. Single-view imaging systems lack the geometric information necessary to distinguish between light rays originating from interior surfaces behind the glass plane and light rays representing reflections on the glass surface. Prior approaches have not adequately addressed the computational challenge of performing real-time depth-based classification of pixels into interior-origin versus reflection-origin categories while vehicles traverse inspection lanes at operational speeds. Additionally, color accuracy requirements for defect detection demand transmittance compensation techniques that account for per-pane variations in glass tint and spectral filtering characteristics, while privacy considerations require automated redaction of occupants, introducing further computational complexity that must be integrated into a real-time inspection pipeline.

Embodiments of the present invention provide substantial technical benefits over prior art vehicle inspection systems. The multi-view parallax-based classification achieves reflection suppression effectiveness of for example approximately 15 to 25 decibels, corresponding to for example a 95 to 99.7 percent reduction in reflection interference compared to baseline single-view capture. This substantial reduction in reflection energy enables reliable interior defect detection without requiring physical access to the vehicle interior. The depth separation resolution of the system, defined as the smallest measurable apparent-depth offset between a reflection on the glass plane and a true interior feature, is for example approximately 2 to 5 millimeters under typical operating parameters, which suffices for detecting defects on seats, dashboards, and trim surfaces. The throughput improvement achieved by the automated system is substantial, with capture requiring for example approximately 0.1 to 0.2 seconds per vehicle and processing requiring for example approximately 0.5 to 1.0 seconds, yielding a total cycle time of less than or equal to 2 seconds per vehicle. This enables throughput of for example approximately 1800 to 2500 vehicles per hour per lane, representing for example a 30 to 40 fold improvement over the 40 to 60 vehicles per hour achievable with manual door-opening inspection. The cost savings are correspondingly substantial.

The optional asymmetric illumination embodiment recited in the dependent claims may provide an additional 5 to 8 decibels of reflection suppression compared to geometry-only methods, with particular effectiveness for flat glazing and high-gloss dashboard reflections under bright ambient conditions. The optional polarization embodiment recited in the dependent claims may provide typical suppression improvement of 3 to 6 decibels for near-normal incidence and up to 10 decibels under grazing angles exceeding 45 degrees, with particular value for side windows and windshields with laminated layers. The transmittance compensation embodiment recited in the dependent claims improves colorimetric accuracy by reducing delta E color difference by approximately 15 to 25 percent and improves defect detection accuracy by approximately 8 to 12 percent, with fewer false negatives occurring in darker interiors. This compensation is critical for differentiating dark defects on dark seats viewed through tinted glazing where without compensation the defect contrast may fall below detection thresholds.

The privacy redaction embodiment recited in the dependent claims enables the system to detect occupants or faces in interior-enhanced images and redact them before outputting defect metadata, ensuring privacy compliance while preserving defect evidence necessary for inspection records. The temporal burst capture embodiment spanning 50 to 200 milliseconds with 3 to 10 frames per viewpoint ensures that vehicle motion creates sufficient parallax for depth discrimination while avoiding excessive motion blur. The motion refocusing embodiment warps frames according to interior depth hypotheses and aggregates them with weighting that suppresses reflection-origin pixels, creating a computational focus stack where interior textures sharpen through constructive alignment while glass-plane reflections blur due to misalignment.

Embodiments of the invention enable practical deployment of automated through-glass interior inspection in high-throughput vehicle processing environments including manufacturing facilities, distribution centers, auction yards, vehicle reconditioning facilities, and rental return facilities. Quality control personnel can focus their attention on vehicles and locations with identified issues rather than manually inspecting every interior. The system generates comprehensive defect inventories that guide reconditioning work orders, specifying which seats require repair, which dashboard components need replacement, and which trim elements show damage. The automated inspection improves consistency of condition assessment and reduces time required to prepare detailed reconditioning estimates or damage claim documentation. The elimination of door-opening requirements reduces damage risk, contamination risk, and warranty claims while avoiding the equipment and operational complexity of installing and removing interior camera systems.

Embodiments of the invention provide a technological solution to a technical problem through specific improvements in computer vision, optical physics, and image processing technologies. The method transforms the physical state of a computing system by processing image data through computational steps including motion field computation using optical flow algorithms with sub-pixel precision, parallax-based depth classification comparing apparent depth relative to window pane planes, motion refocusing that computationally sharpens interior content while blurring reflections, optional asymmetric illumination creating measurable reflection-response metrics, and transmittance compensation enabling color-accurate defect detection through tinted glazing. These improvements provide concrete measurable technical benefits including 15 to 25 decibel reflection suppression, 2 to 5 millimeter depth resolution, 30 to 40 fold throughput improvement over manual inspection, and 90 to 95 percent cost reduction.

As used herein, the term "multi-view imaging" refers to the capture of images of a scene from two or more spatially separated viewpoints, wherein the spatial separation between viewpoints creates parallax that enables depth discrimination based on apparent pixel displacement between views.

As used herein, the term "window pane" or "glazing" refers to any transparent or translucent panel of a vehicle through which interior features may be viewed, including but not limited to side windows, windshields, rear windows, sunroof panels, and quarter windows.

As used herein, the term "motion field data" refers to pixel-wise displacement vectors representing the apparent motion of image features between frames captured at different times or from different viewpoints, computed using optical flow algorithms, structure-from-motion techniques, or other motion estimation methods.

As used herein, the term "interior-origin pixel" refers to a pixel whose intensity value is primarily determined by light rays that passed through the window pane after reflecting from surfaces within the vehicle interior located behind the window pane plane.

As used herein, the term "reflection-origin pixel" refers to a pixel whose intensity value is primarily determined by light rays that reflected from the outer or inner surface of the window pane itself, representing specular reflections of the environment rather than transmitted interior content.

As used herein, the term "apparent depth" refers to the estimated distance of a scene feature from the imaging device as inferred from parallax measurements, disparity calculations, or motion field analysis.

As used herein, the term "disparity signature" refers to the pattern of pixel displacement as a function of viewpoint change that characterizes whether a pixel originates from a particular depth plane, computed from motion field data and camera geometry.

As used herein, the term "specular flow" refers to the motion pattern exhibited by specular reflections on a planar surface, governed by the laws of mirror reflection and characterized by motion vectors that differ systematically from those of scene features at other depths.

As used herein, the term "interior-enhanced image" refers to an image generated through processing of multiple captured frames wherein reflection components have been suppressed and interior content has been enhanced through techniques including pixel classification, reflection attenuation, and motion refocusing.

As used herein, the term "motion refocusing" or "motion-refocused reconstruction" refers to a computational process whereby multiple images captured during relative motion are warped according to depth hypotheses and aggregated with weighting that sharpens features at a target depth while blurring features at other depths.

As used herein, the term "transmittance compensation" refers to the process of estimating the wavelength-dependent attenuation and chromatic bias introduced by window glazing and applying corrective transformations to recover color-accurate representations of interior content.

As used herein, the term "asymmetric illumination" refers to an illumination strategy wherein light sources positioned on different sides of an imaging axis are activated at different times or with different intensities to create differential reflection signatures that enable enhanced reflection suppression.

As used herein, the term "reflection-response metric" refers to a quantitative measure of the degree to which a pixel's intensity changes in response to asymmetric illumination, indicating the extent to which that pixel is dominated by specular reflections.

As used herein, the term "temporal burst" refers to a sequence of images captured over a short time interval, typically spanning 50-200 milliseconds, during which relative motion between the vehicle and imaging device creates the parallax necessary for multi-view depth analysis.

As used herein, the term "baseline" refers to the spatial separation distance between the optical centers of two cameras in a multi-camera rig, or the effective displacement between viewpoints in a temporal multi-view capture system.

As used herein, the term "defect metadata" refers to structured data describing detected interior defects, including defect classification, spatial location within the vehicle cabin, detection confidence, temporal stability across frames, and associated image evidence.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which schematically illustrates a system for detecting interior defects in a vehicle through glazing in accordance with one or more embodiments of the present invention. The system comprises an imaging device 110 configured to be positioned external to vehicle 100 and to capture a plurality of images of vehicle window pane 102 from at least two spatially separated viewpoints as vehicle 100 changes position relative to imaging device 110 along motion path 106. In one or more embodiments, imaging device 110 may comprise a multi-camera rig with at least two cameras including first camera 112 and second camera 114 providing the at least two spatially separated viewpoints. The spatial separation between viewpoints, designated as baseline 116, is selected to maximize disparity at expected depth ranges while minimizing occlusion and maintaining overlap between camera fields of view. For sedan-scale vehicles, an optimal baseline 116 between viewpoints may be approximately 25-35 centimeters. For large sport utility vehicles or vans, baseline 116 may extend up to approximately 50 centimeters. The determination of optimal baseline 116 may be performed through simulation of stereo geometry to maximize disparity at expected depth ranges of 0.5-1 meter behind the glass plane while maintaining sufficient overlap and avoiding excessive occlusion.

The system further comprises one or more processors 120 operatively coupled to imaging device 110. Processors 120 may comprise graphics processing units configured for parallel computation of motion field data and image warping operations. The system additionally comprises memory 122 storing instructions executable by processors 120. Memory 122 may comprise volatile memory for real-time processing buffers and non-volatile storage for calibration parameters, defect detection models, and inspection results.

Imaging device 110 is positioned to view vehicle window panes 102 as vehicles 100 traverse an inspection lane. The relative motion 106 between vehicle 100 and imaging device 110 creates the multi-view geometry necessary for parallax-based depth classification. In one or more embodiments, imaging device 110 may remain stationary while vehicles 100 move through the inspection lane. In alternative embodiments, imaging device 110 may move relative to stationary vehicles 100. The relative velocity and timing may be coordinated to achieve the desired temporal burst characteristics and baseline separation.

In one or more embodiments incorporating asymmetric illumination, the system may further comprise illumination sources 130 configured to provide asymmetric illumination to vehicle window pane 102. Illumination sources 130 may comprise left-bank strobe 132 and right-bank strobe 134 controllable to fire within 20 milliseconds of each other. Left-bank strobe 132 and right-bank strobe 134 may be spatially separated on opposite sides of the imaging device optical axis. The asymmetric firing sequence creates differential reflection signatures that enable calculation of a reflection-response metric. The asymmetric illumination may provide an additional 5-8 decibels of reflection suppression compared to geometry-only methods, with particular effectiveness for flat glazing and high-gloss dashboard reflections.

In one or more embodiments incorporating polarization, imaging device 110 may include one or more linear polarizing analyzers 140 positioned in front of camera lenses of first camera 112 and second camera 114. Linear polarizing film may be applied to selected illumination banks 132, 134 to create controlled polarization states. Cross-polarization configurations with analyzer angles of approximately 90 degrees relative to illumination polarization or time-multiplexed analyzer angles in back-to-back frames may provide additional specular reflection attenuation. Polarization may provide typical suppression improvement of 3-6 decibels for near-normal incidence and up to 10 decibels under grazing angles exceeding 45 degrees. Polarization may be particularly valuable for side windows and windshields with laminated layers. Under conditions where polarization reduces light throughput below acceptable levels, the system may automatically disable polarization or raise strobe energy within safety limits to maintain adequate signal levels.

The system may include calibration subsystems for determining geometric relationships between imaging device 110 components and vehicle 100 surfaces. The plane of each window pane 102 may be estimated from vehicle contours detected in captured images or from learned pane masks derived from training data across vehicle types. Extrinsic calibration parameters relating camera positions and orientations may be refined through bundle adjustment on repeated passes of calibration vehicles. The refined extrinsic parameters enable accurate computation of epipolar constraints for motion field regularization and precise warping for interior refocusing.

The computational pipeline implemented by processors 120 operates on streaming image data from imaging device 110. The pipeline may comprise modules for optical flow computation, parallax-based classification, motion refocusing, photometric correction, defect detection, and privacy redaction. The modular architecture enables parallel processing of multiple vehicle panes and supports total lane latency within seconds from vehicle entry to defect report generation.

The defect detection module may implement trained models for recognizing interior defects including seat tears or burns, missing headrests, dashboard or console cracks, missing knobs or vent grilles, headliner sag, rear-view mirror mount damage, airbag cover deformation, and loose-object hazards. The detection models operate on the interior-enhanced images generated by the reflection suppression and transmittance compensation pipeline. Detections may be validated across adjacent frames and viewpoints, with single-frame artifacts discarded based on temporal and spatial consistency. Each validated detection may be assigned a stability score indicating confidence in the detection across multiple observations.

Localization of detected defects within vehicle interior 104 may be performed by mapping pane coordinates to cabin zones using generic seat geometry priors. The system may maintain models of standard cabin layouts including row positions, seat locations, and structural zones. Vehicle identification number specific priors may optionally be incorporated when available to improve localization accuracy for specific vehicle models with known interior configurations. System interface 150 may present the detected defects and their locations to operators or quality control systems.

Reference is now made to FIG. 2, which illustrates a flowchart of a method for detecting interior defects in a vehicle through glazing in accordance with one or more embodiments of the present invention. The method may be implemented by the system depicted in FIG. 1 or by other suitable computing and imaging systems. The method begins at step 200 with a region of interest scheduling and capture phase. The system predicts when each window pane 102 of vehicle 100 will be optimally framed within the field of view of imaging device 110 based on vehicle velocity, imaging device position, and known vehicle geometry. For each pane, the system captures a burst of images from at least two cameras 112, 114 over a time interval. In one or more embodiments, the temporal burst may span approximately 50-200 milliseconds. In further embodiments, the temporal burst may comprise 3-10 frames per viewpoint. The relatively short burst duration ensures that vehicle motion creates sufficient parallax for depth discrimination while avoiding excessive motion blur. The capture timing may be synchronized with vehicle position to maximize the quality of captured window pane imagery.

The exposure policy for image capture may favor highlight preservation on the glass surface to avoid saturation in specular reflection regions. High dynamic range bracketing may be enabled when the dynamic range of the scene exceeds the native sensor dynamic range, with multiple exposures captured and subsequently merged to preserve detail in both bright reflections and darker interior regions. The captured images may be transferred to the processing pipeline for subsequent analysis.

At step 202, the method continues with glazing segmentation to identify the boundaries and geometry of each window pane 102. Pane contours may be segmented using a combination of geometric priors derived from known vehicle dimensions and semantic segmentation models trained to recognize vehicle glazing. The segmentation may exclude structural elements including pillars, mirrors, and windshield wipers that would interfere with interior viewing. The segmented pane mask defines the region of interest for subsequent pixel-level processing.

At step 204, the method proceeds to parallax-based layer classification to distinguish interior-origin pixels from reflection-origin pixels. This classification exploits the fundamental geometric difference between objects behind the glass plane and reflections on the glass surface. Motion fields may be estimated across the captured burst using optical flow algorithms regularized by epipolar constraints derived from the known camera geometry and relative motion. In one or more embodiments, the motion field computation may implement the Recurrent All-Pairs Field Transforms algorithm, which provides dense optical flow with sub-pixel precision of less than 0.1 pixels. As an alternative, feature-based structure-from-motion techniques may be employed as a fallback when texture in the scene is insufficient for dense optical flow computation. The motion field data represents pixel displacement vectors with horizontal and vertical components for each pixel location within the region of interest.

At step 206, for each pixel in the pane region of interest, the method computes a disparity signature that characterizes how the apparent displacement of that pixel scales with camera viewpoint change. This corresponds to the dependent claim embodiment reciting calculation of disparity signatures. Pixels originating from true interior scene points behind the glass exhibit inverse depth behavior, with disparity proportional to the inverse of depth and yielding consistent parallax in the same direction as camera translation. For a true scene point at depth Z, the disparity can be expressed as the product of baseline b and focal length f divided by Z. In contrast, pixels originating from reflections on the glass surface move with an inverted or damped flow pattern because their apparent motion is a function of the virtual reflected geometry. For a reflected point on the glass plane at depth Z0 reflecting an object at depth Zr, the disparity is approximately negative b times f times the quantity Zr minus Z0, divided by the product Zr times Z0. This sign and magnitude difference between interior-origin and reflection-origin disparity signatures enables classification. The disparity signature calculation may be performed from the motion field data and known camera geometry, as recited in the corresponding dependent claim, where the known camera geometry includes focal lengths, principal points, lens distortion parameters, and baseline vectors between cameras 112, 114.

At step 208, the classification logic compares the computed disparity signature for each pixel against expected signatures for interior depth behind window pane 102 plane versus signatures for glass-plane specular flow. Pixels with disparity signatures consistent with depth behind the pane plane, meaning positive parallax in the direction of camera motion with magnitude corresponding to interior distances, are classified as interior-origin pixels. Pixels with trajectories that match glass-plane specular flow, meaning motion patterns consistent with reflection of environmental geometry, are classified as reflection-origin pixels.

In one or more embodiments, classifying pixels as reflection-origin pixels may comprise determining that the apparent depth matches a specular flow pattern corresponding to reflections on window pane 102 plane. The specular flow model is based on the mirror reflection law. If n represents the normal vector of the glass plane and t represents the translation vector of the camera, the reflected point's image motion is approximately equal to 2 times the dot product of n and t times n, minus t. This results in a near-planar flow field aligned with the plane normal and invariant to interior geometry. The system may fit a parametric flow model, such as an affine plane flow model, to the region of interest. Pixels that conform to this model with residual error below a threshold epsilon are labeled as reflection-origin pixels.

At step 210, the method further comprises a specular flow and environment attenuation phase. A low-rank environment component may be fitted to represent the reflection layer tied to the pane plane geometry. This environment component models moving sky, structures, and other environmental reflections that appear on the glass surface. The reflection component may be attenuated on a per-pixel basis using soft subtraction with edge preservation near mullions, defroster lines, and other fine structures where abrupt transitions between interior and reflection layers may occur. The attenuation reduces the energy of the reflection component while preserving edges that may be important for defect detection.

At step 212, the method continues with motion-refocused interior reconstruction based on for example warping and aggregation. This phase exploits the vehicle pose change and camera rig geometry to computationally refocus on interior depth planes. The approach may implement plane-sweep refocusing by assuming candidate interior depths behind the glass plane. In one or more embodiments, multiple depth hypotheses may be evaluated, such as 0.3 meters, 0.5 meters, and 0.8 meters behind the glass. For each candidate depth, frames from the plurality of images may be warped according to the interior depth hypothesis using the known vehicle pose change and camera rig geometry. The warping operation transforms each image to align features at the hypothesized interior depth. The warped frames may be aggregated using robust weighting schemes such as weighted median or variance minimization, with weighting that suppresses the reflection-origin pixels while enhancing interior-origin pixels. The depth hypothesis that yields the highest local sharpness metric is selected as the best estimate for that region, thereby sharpening interior textures while blurring glass-plane reflections. This process effectively creates a computational focus stack where interior textures at the true depth sharpen through constructive alignment while glass-plane reflections blur due to misalignment. The output of this phase is an interior-enhanced image for window pane 102 in which interior content is emphasized and reflection content is suppressed.

At step 214, in one or more embodiments corresponding to the dependent claims reciting asymmetric illumination, the method may include firing left-bank illumination strobe 132 at a first time, capturing a first frame with left-bank illumination strobe 132 active, firing right-bank illumination strobe 134 at a second time within 20 milliseconds of the first time, and capturing a second frame with right-bank illumination strobe 134 active. In further embodiments, the method may further comprise computing a reflection-response metric based on a difference between the first frame and the second frame. The reflection-response metric may be computed as the absolute value of the difference between the left-illuminated frame and the right-illuminated frame, optionally normalized by the average of the two frames. Pixels with high reflection-response metric values indicate regions dominated by specular reflections that respond strongly to changes in illumination direction. These pixels may be suppressed during generation of the interior-enhanced image while preserving chroma and texture that remain consistent across the left and right illuminated frames. This asymmetric illumination approach increases interior-to-reflection separability under bright ambient conditions by providing an additional 5-8 decibels of reflection suppression beyond the baseline parallax method.

In one or more embodiments, capturing the plurality of images may comprise capturing with one or more linear polarizing analyzers 140 positioned in front of camera lenses of imaging device 110. The polarization variant may employ linear polarizing film applied to selected light banks 132, 134 and linear analyzers 140 applied to lenses, with cross-polarization at approximately 90 degrees or time-multiplexed analyzer angles in back-to-back frames fused with the reflection-response metric to further attenuate speculars. If light throughput falls due to polarization, the system may automatically disable polarization or raise strobe energy within safety limits.

At step 216, the method further comprises tint and transmittance compensation based on for example reciting transmittance map estimation and compensation. Vehicle glazing exhibits transmittance values typically ranging from 65-85 percent, with tinted windows introducing both attenuation and chromatic bias. A per-pane transmittance map may be estimated from the captured burst, including high dynamic range exposures when available. The transmittance estimation may use cabin albedo priors that encode expected reflectance characteristics of typical interior surfaces and exposure statistics that relate measured pixel intensities to expected interior brightness levels. The transmittance map may be computed on a per-channel basis to account for wavelength-dependent filtering by tinted glass. Transmittance compensation may be applied to the interior-enhanced image based on the per-pane transmittance map through de-attenuation and color correction operations. The compensation improves colorimetric accuracy by reducing delta E color difference by approximately 15-25 percent. Defect detection accuracy improves by approximately 8-12 percent, with fewer false negatives occurring in darker interiors. The compensation may be critical for differentiating dark defects on dark seats viewed through tinted glazing, where without compensation the defect contrast may fall below detection thresholds.

At step 218, the method proceeds to interior defect detection and validation. A defect detection algorithm may be applied to the interior-enhanced image after transmittance compensation. The detector may identify interior defects including seat tears or burns, missing headrests, dashboard or console cracks, missing knobs or vent grilles, headliner sag, rear-view mirror mount damage, airbag cover deformation, and loose-object hazards. The detection algorithm may comprise one or more trained neural network models, traditional computer vision feature detectors, or hybrid approaches. At step 220, detections may be validated across adjacent frames and viewpoints to eliminate single-frame artifacts caused by transient reflections, sensor noise, or motion blur. Detections that appear consistently across multiple frames and from multiple viewpoints may be retained and assigned a stability score indicating the level of confidence based on cross-frame consistency. This validation step substantially reduces false positive detections that might arise from spurious image features.

At step 222, in one or more embodiments, the method may include detecting occupants or faces in the interior-enhanced image and redacting the occupants or faces before outputting the defect metadata. Face detection algorithms may identify regions containing human faces or other personally identifiable features. The identified regions may be redacted through pixelization, blurring, masking, or replacement with neutral content. The redaction may be integrated into the processing pipeline such that stored defect crops and exported defect metadata contain only redacted imagery, ensuring privacy compliance while preserving the defect evidence necessary for inspection records.

At step 224, the method outputs defect metadata identifying each detected interior defect and its location within vehicle interior 104. The defect metadata may include defect class indicating the type of defect such as seat tear or dashboard crack, defect location specified in pane-relative coordinates that are subsequently mapped to cabin row and side using generic seat geometry priors, detection confidence derived from the detector output, stability score indicating cross-frame validation results, and redacted image crops showing the defect region with any occupants or faces redacted. The defect metadata may be formatted as structured data for integration with vehicle inspection databases and quality control systems and may be presented via interface 150.

In an exemplary use case, the system may be deployed in a vehicle inspection lane at a manufacturing facility, distribution center, or auction yard. Vehicles 100 may proceed through the lane at controlled speed, typically 3-8 kilometers per hour. As each vehicle 100 enters the lane, imaging system 110 may identify the vehicle and predict the positions of window panes 102 based on vehicle type and geometry. The system may capture multi-view bursts for each window pane 102, process the bursts through the reflection suppression and defect detection pipeline, and generate a comprehensive interior inspection report within seconds of the vehicle passing through the lane. The report may identify any detected defects with location information, enabling quality control personnel to focus their attention on vehicles and locations with identified issues rather than manually inspecting every interior.

In another exemplary use case, the system may be deployed in a vehicle reconditioning facility where used vehicles are prepared for resale. The automated through-glass inspection may provide rapid assessment of interior condition without requiring technicians to open doors and manually inspect each surface. The system may generate a defect inventory that guides reconditioning work orders, specifying which seats require repair, which dashboard components need replacement, and which trim elements show damage. The automated inspection improves consistency of condition assessment and reduces the time required to prepare detailed reconditioning estimates.

In a further exemplary use case, the system may be deployed at a vehicle rental return facility where returned vehicles must be inspected for damage before being returned to the rental fleet. The through-glass inspection enables rapid damage assessment without requiring attendants to enter each vehicle, reducing rental return processing time and improving customer experience. The system may automatically generate damage reports with photographic evidence, supporting subsequent damage claim processing.

The method may incorporate near-infrared assisted capture in embodiments where ambient lighting is insufficient for visible-spectrum imaging. Narrow-band near-infrared light-emitting diodes and matching optical filters may be employed to illuminate vehicle interior 104 through glazing 102 while minimizing ambient light interference. The near-infrared wavelength range provides adequate transmission through typical automotive glazing and enables capture of interior detail under low-light conditions such as overnight processing or indoor facilities with limited lighting. In one or more embodiments implementing a learning-free fallback for pane quality assessment, the system may evaluate the reconstruction signal-to-noise ratio of the interior-enhanced image. When the reconstruction signal-to-noise ratio falls below a threshold value due to heavy tint, rain, condensation, or other factors that degrade through-glass visibility, the system may report insufficient visibility and log the pane condition rather than attempting defect detection. This fallback prevents false negative detections that might occur when visibility is inadequate for reliable defect identification. The pane condition log enables subsequent manual inspection or re-inspection after conditions improve.

The method may incorporate vehicle identification number specific priors when available to improve accuracy of defect localization and detection. For known vehicle models, the system may access detailed cabin geometry specifications including exact seat positions, dashboard layouts, and typical defect patterns. This vehicle-specific knowledge enables more precise mapping from pane coordinates to specific cabin components and may improve defect detection accuracy by incorporating model-specific appearance priors.

The invention provides a technical solution to a technical problem. The claimed invention is not directed to an abstract idea but rather to a specific technological process for through-glass defect detection using multi-view geometric analysis. The method transforms the physical state of a computing system by processing image data through computational steps including motion field computation, parallax-based depth classification, motion refocusing, transmittance compensation, and defect detection to generate actionable defect metadata that did not previously exist. The technological improvements may include the specific combination of multi-view capture timing, parallax-based layer classification comparing apparent depth relative to window pane 102 plane, motion refocusing that sharpens interior content while blurring reflections, optional asymmetric illumination 130 creating measurable reflection-response metrics, and transmittance compensation enabling color-accurate defect detection through tinted glazing. These improvements are rooted in computer vision, optical physics, and image processing technologies and provide concrete technical benefits which may include measured reflection suppression of 15-25 decibels, depth resolution of 2-5 millimeters, and/or throughput improvement of 30-40 fold over manual inspection.

The foregoing description of specific embodiments reveals the general nature of the invention sufficiently that others can, by applying current knowledge, readily modify and adapt it for various applications without departing from the general concept. Therefore, such adaptations and modifications are within the meaning and range of equivalents of the disclosed embodiments. The phraseology or terminology employed herein is for the purpose of description and not of limitation.

It is expected that during the life of a patent maturing from this application many relevant methods and systems will be developed and the scope of the terms imaging systems and sensors are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method for detecting interior defects in a vehicle through glazing, comprising: capturing, with an imaging device positioned external to the vehicle, a plurality of images of a vehicle window pane from at least two spatially separated viewpoints as the vehicle changes a position relative to the imaging device;

computing, for pixels within a region of interest corresponding to the window pane, motion field data representing pixel displacement;

classifying the pixels based on the motion field data into interior-origin pixels and reflection-origin pixels by comparing apparent depth of the pixels relative to a plane of the window pane, wherein pixels with apparent depth behind the window pane plane are classified as interior-origin pixels and pixels with apparent depth at or on the window pane plane are classified as reflection-origin pixels;

generating an interior-enhanced image using the interior-origin pixels and the reflection-origin pixels; and applying a defect detection algorithm to the interior-enhanced image to identify one or more interior defects and outputting defect metadata identifying a detected interior defect and its location within the vehicle cabin.

2. The method of claim 1, wherein the plurality of images are captured during a temporal burst that spans 50-200 milliseconds.

3. The method of claim 2, wherein the temporal burst comprises 3-10 frames per viewpoint.

4. The method of claim 1, wherein the at least two spatially separated viewpoints comprise at least two cameras of a multi-camera rig.

5. The method of claim 1, wherein classifying the pixels comprises calculating, from the motion field data, a disparity signature for each pixel that indicates the apparent depth.

6. The method of claim 5, wherein calculating the disparity signature comprises calculating from the motion field data and known camera geometry.

7. The method of claim 1, wherein classifying pixels as reflection-origin pixels comprises determining that the apparent depth matches a specular flow pattern corresponding to reflections on the window pane plane.

8. The method of claim 1, wherein generating the interior-enhanced image comprises:

warping frames from the plurality of images according to an interior depth hypothesis using vehicle pose change and camera rig geometry to refocus on interior surfaces; and aggregating the warped frames with weighting that suppresses the reflection-origin pixels, thereby sharpening interior textures while blurring glass-plane reflections.

9. The method of claim 1, further comprising:

estimating a per-pane transmittance map for the window pane; and applying transmittance compensation to the interior-enhanced image based on the per-pane transmittance map.

10. The method of claim 1, further comprising:

detecting occupants or faces in the interior-enhanced image; and redacting the occupants or faces before outputting the defect metadata.

11. The method of claim 1, wherein capturing the plurality of images comprises:

firing a left-bank illumination strobe at a first time;

capturing a first frame with the left-bank illumination strobe active;

firing a right-bank illumination strobe at a second time within 20 milliseconds of the first time; and capturing a second frame with the right-bank illumination strobe active.

12. The method of claim 11, further comprising:

computing a reflection-response metric based on a difference between the first frame and the second frame; and suppressing pixels with high reflection-response metric values during generation of the interior-enhanced image.

13. The method of claim 1, wherein capturing the plurality of images comprises capturing with one or more linear polarizing analyzers positioned in front of camera lenses of the imaging device.

14. A system for detecting interior defects in a vehicle through glazing, comprising:

an imaging device configured to be positioned external to the vehicle and to capture a plurality of images of a vehicle window pane from at least two spatially separated viewpoints as the vehicle changes a position relative to the imaging device;

one or more processors; and memory storing instructions that, when executed by the one or more processors, cause the system to:

compute, for pixels within a region of interest corresponding to the window pane, motion field data representing pixel displacement;

classify the pixels based on the motion field data into interior-origin pixels and reflection-origin pixels by comparing apparent depth of the pixels relative to a plane of the window pane, wherein pixels with apparent depth behind the window pane plane are classified as interior-origin pixels and pixels with apparent depth at or on the window plane classified pane are as reflection-origin pixels;

detect one or more interior defects and its location within the vehicle cabin based on an analysis of the interior-origin pixels and the reflection-origin pixels and update an interface to present the one or more interior defects and its location within the vehicle cabin.

15. The system of claim 14, wherein the imaging device comprises a multi-camera rig with at least two cameras providing the at least two spatially separated viewpoints.

16. The system of claim 14, wherein the imaging device is configured to capture the plurality of images during a temporal burst that spans 50-200 milliseconds and comprises 3-10 frames per viewpoint.

17. The system of claim 14, further comprising illumination sources configured to provide asymmetric illumination to the vehicle window pane.

18. The system of claim 17, wherein the illumination sources comprise a left-bank strobe and a right-bank strobe controllable to fire within 20 milliseconds of each other.

19. The system of claim 14, wherein the imaging device includes one or more linear polarizing analyzers positioned in front of camera lenses.

20. The system of claim 14, wherein the memory stores further instructions that, when executed, cause the system to:

estimate a per-pane transmittance map for the window pane; and apply transmittance compensation to the interior-enhanced image based on the per-pane transmittance map.

* * * * *